(12) United States Patent
Kim

(10) Patent No.: US 6,188,439 B1
(45) Date of Patent: Feb. 13, 2001

(54) BROADCAST SIGNAL RECEIVING DEVICE AND METHOD THEREOF FOR AUTOMATICALLY ADJUSTING VIDEO AND AUDIO SIGNALS

(75) Inventor: Jin-Bog Kim, Suwon (KR)

(73) Assignee: Samsung Electronics Co., Ltd. (KR)

( * ) Notice: Under 35 U.S.C. 154(b), the term of this patent shall be extended for 0 days.

(21) Appl. No.: 09/059,928

(22) Filed: Apr. 14, 1998

(30) Foreign Application Priority Data

Apr. 14, 1997 (KR) .................................. 97-13598

(51) Int. Cl.[7] .............................. H04N 5/44; H04N 7/087; H04N 5/60
(52) U.S. Cl. ......................... 348/553; 348/478; 348/725; 348/738
(58) Field of Search .................................. 348/473, 478, 348/482, 484, 553, 725, 729, 738; H04N 7/08, 7/087, 5/44, 5/60

(56) References Cited

U.S. PATENT DOCUMENTS 5,661,526 * 8/1997 Hamamoto ........................... 348/473

* cited by examiner

*Primary Examiner*—Sherrie Hsia
(74) *Attorney, Agent, or Firm*—Dilworth & Barrese, LLP

(57) ABSTRACT

The present invention relates to a broadcast signal receiving device and method thereof in which genre data of a broadcast signal is detected to thereby automatically be converted to an appropriate video and audio signal. According to the present invention a broadcast signal including genre data is processed for being converted into an appropriate signal according to a control signal previously stored in a memory thereby to provide a best condition for the video and audio. Furthermore, the televiewer can change data for the video and audio established to fit the genre data at the time of manufacturing the set, and can adjust the current program being broadcasted to a certain data.

17 Claims, 4 Drawing Sheets

| MODE(CODE) | SCREEN | SOUND(%) |
|---|---|---|
| NEWS(01) | BRIGHT<br>COLOR=NORMAL | MEDIUM · HIGH:80<br>LOW:30 |
| MUSIC CONCERT(02) | SLIGHT DARK<br>COLOR=SLIGHT DARK TONE | LOW:80<br>MEDIUM:50<br>HIGH:40 |
| SPORTS(03) | BRIGHT | MEDIUM · HIGH:70<br>LOW:30 |
| CINEMA(04) | SLIGHT DARK | LOW:60<br>MEDIUM:60<br>HIGH:40<br>SURROUND:EFFECT SOUND ON<br>*R/L TIME DIFFERENCE<br>MAINTAINS MAXIMUM |
| ⋮ | ⋮ | ⋮ |

*FIG. 3*

BROADCAST SIGNAL RECEIVING DEVICE AND METHOD THEREOF FOR AUTOMATICALLY ADJUSTING VIDEO AND AUDIO SIGNALS

BACKGROUND OF THE INVENTION

1. Field of the Invention

The present invention relates to a broadcast signal receiving device and method thereof in which genre data of the broadcast signal is detected thereby automatically being converted to an appropriate video and audio signal in accordance with a broadcasting mode.

2. Description of the Prior Art

A broadcasting station broadcasts various programs such as news, music concerts, sports, drama, education and documentary drama and transmits a broadcast signal over the air to a receiving system such as, a television set.

A televiewer selects a program which he wants to watch from various programs that are available and adjusts the conditions of video and audio to desired levels for the selected program.

However, it is often troublesome for the televiewer to adjust the conditions of video and audio signals each time the televiewer selects a program to watch. Accordingly, functions for adjusting the conditions of video and audio signal are often difficult to use, or it is unknown by the televiewer how to use these functions.

To overcome the problem as above-described, there is disclosed herein a device and method in which the televiewer selects a program, and appropriate conditions for audio and video signal level are automatically adjusted for various programs where audio and video levels are previously set in a memory.

SUMMARY OF THE INVENTION

It is an object of the present invention to provide a broadcast signal receiving device and method thereof in which genre data is detected to automatically convert to appropriate video and audio conditions for a given program.

To achieve the above object, the present invention provides a broadcast signal receiving method including the steps of receiving a broadcast signal through an antenna from a broadcasting station, detecting genre data of a program from the broadcast signal, decoding the detected genre data of the program, reading a video and audio control signal corresponding to the result of the decoding, and adjusting the current video and audio condition according to the control signal.

Furthermore, the present invention provides a broadcast signal receiving device including a tuner for selectively receiving a broadcast signal input through an antenna by a channel selection signal, a signal processing unit for processing the broadcast signal input from the tuner to be converted into an appropriate signal to comply with a set. Also included is a video and audio signal separation unit for separating the converted signal from the signal processing unit into a video signal and an audio signal. An audio signal processing unit adjusts the level of audio signal separated by the video and audio signal separation unit. A video signal processing unit adjusts the level of video signal separated by the video and audio signal separation unit. A genre data detection unit adjusts genre data of a program from the video signal separated by the video and audio signal processing unit. A control unit reads the video and audio control signals by decoding the detected data by the data detection unit and outputting the control signals to control the overall operation of the device, and a memory for storing control signals for the read video and audio signal are also included.

BRIEF DESCRIPTION OF THE DRAWINGS

The above objects, and other features and advantages of the present invention will become more apparent from the following detailed description taken in conjunction with the drawings, in which:

FIG. 3 is a table showing an example of data stored in memory according to the present invention.

DETAILED DESCRIPTION OF PREFERRED EMBODIMENTS

Figure 1:
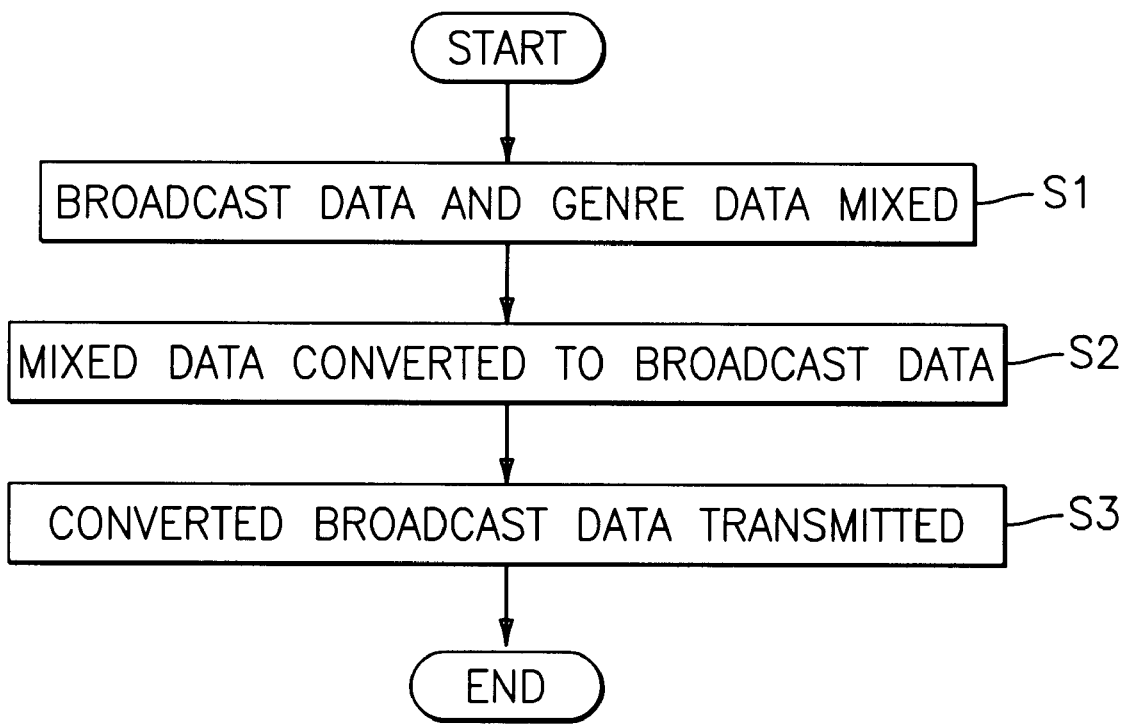
FIG. 1 is a flow chart showing a transmission sequence for a broadcasting signal according to the present invention.

FIG. 1 is a flow chart explaining a transmission sequence of a broadcast signal according to the present invention.

At step S1, a broadcast signal is mixed with inherent data assigned according to each genre of programs. The mixed broadcast data is converted into a broadcast signal to be propagated at step S2.

At step S3, the converted broadcast signal is transmitted to air. Step S1 serves to insert genre data of TV programs, especially data relating to Korea Broadcasting Program System (KBPS) or other broadcasting program systems into a vertical blanking period of a video signal.

The broadcasting station broadcasts a program with some information such as, channel, name of broadcast station, an inherent code of the program, etc. so that the televiewer may enter a code to a program that the televiewer wants to watch through a video tape recorder (VTR). Recording is performed on the VTR when the inherent code being transmitted from the broadcasting station is in compliance with the code previously established in the VTR. Recording is performed by simply reserving the VTR for recording and entering the code. When the code is broadcast the VTR records the program.

Figure 2:
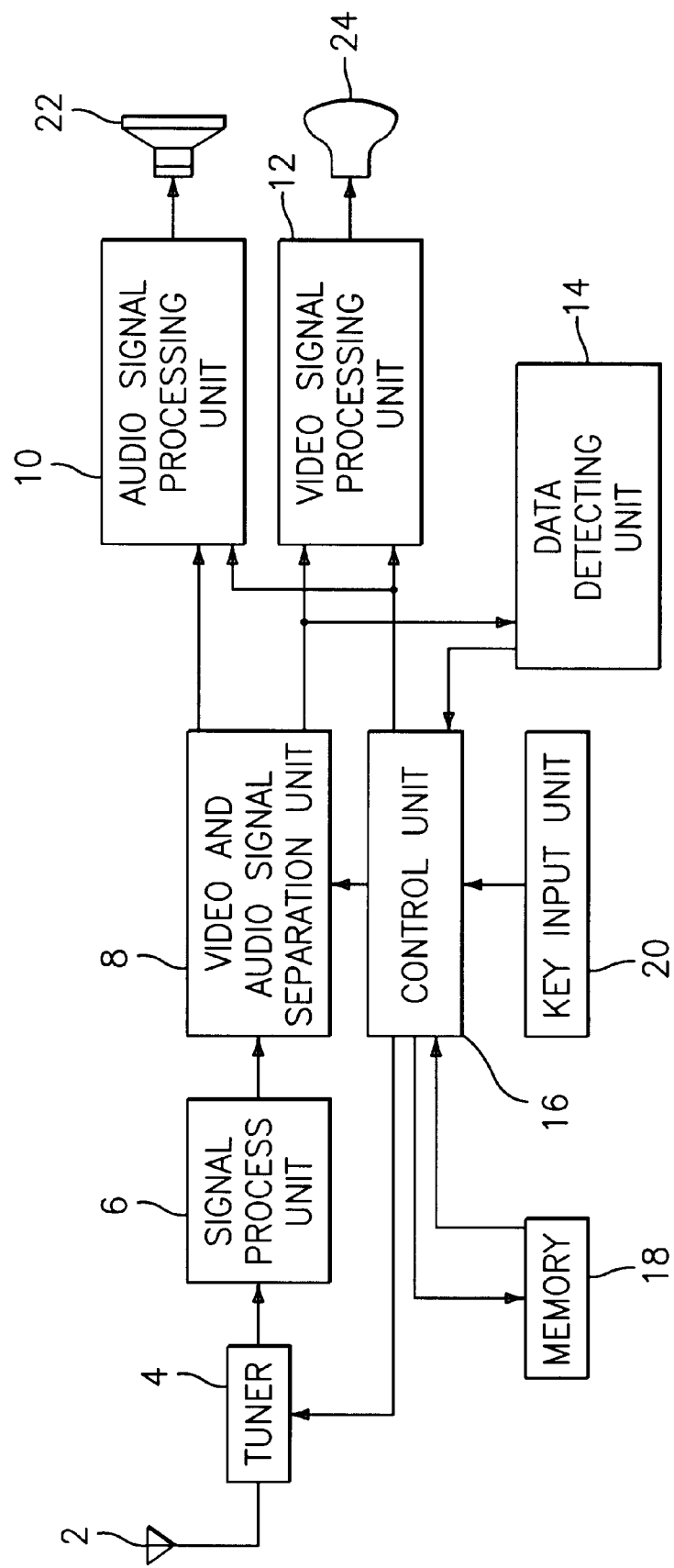
FIG. 2 is a block diagram for a receiving device to automatically convert video and audio levels according to the present invention.

A receiving device as shown in FIG. 2 includes an antenna 2, a tuner 4, a signal processing unit 6, a video and audio signal separation unit 8, an audio signal processing unit 10, a video signal processing unit 12, a data detection unit 14, a control unit 16, a memory 18, a speaker or speakers 22 and a CRT 24.

The tuner 4 serves to selectively receive a broadcast signal being received through the antenna 2 according to a channel selection signal. The signal processing unit 6 serves to process the broadcast signal output from the tuner 4 thereby converting the broadcast signal into an appropriate signal to comply with a channel selected for the television set.

The video and audio signal separation unit 8 serves to separate the converted signal from the signal processing unit 6 into a video signal and an audio signal, respectively. The audio signal processing unit 10 serves to process the separated audio signal from the video and audio signal separation unit 8 and adjusts the level of audio signal. The video signal processing unit 12 serves to process the separated video signal from the video and audio signal separation unit 8 and adjusts the level of video signal.

The genre data detection unit 14 serves to detect genre data from the separated video signal input from the video and audio signal separation unit 8. The control unit 16 serves to read data for controlling video and audio by decoding the detected data from the data detection unit 14 and outputs a control signal to control video and audio signals to the video signal processing unit 12 and the audio signal processing unit 10, respectively.

The control unit 16 also serves to control the overall operation of the device. The control unit 16 decodes the detected data by the genre data detection unit 14, and reads the video and audio control signal corresponding to the genre data thereby outputting the control signal to the video signal processing unit 12 and the audio signal processing unit 10, respectively. Furthermore, the control unit 16 outputs a channel selection signal corresponding to a key signal for channel selection being inputted from the key input unit 20 by a televiewer. The memory 18 serves to store data to control video and audio signals.

FIG. 3 is a table illustrating the control method for controlling the video and audio conditions in accordance with the present invention. As shown in FIG. 3, different types of shows have different video and audio settings to produce different video and audio conditions for television viewing. In the illustrative examples of FIG. 3 a mode and a code are given which automatically set the screen and sound levels in accordance with the invention.

Figure 4:
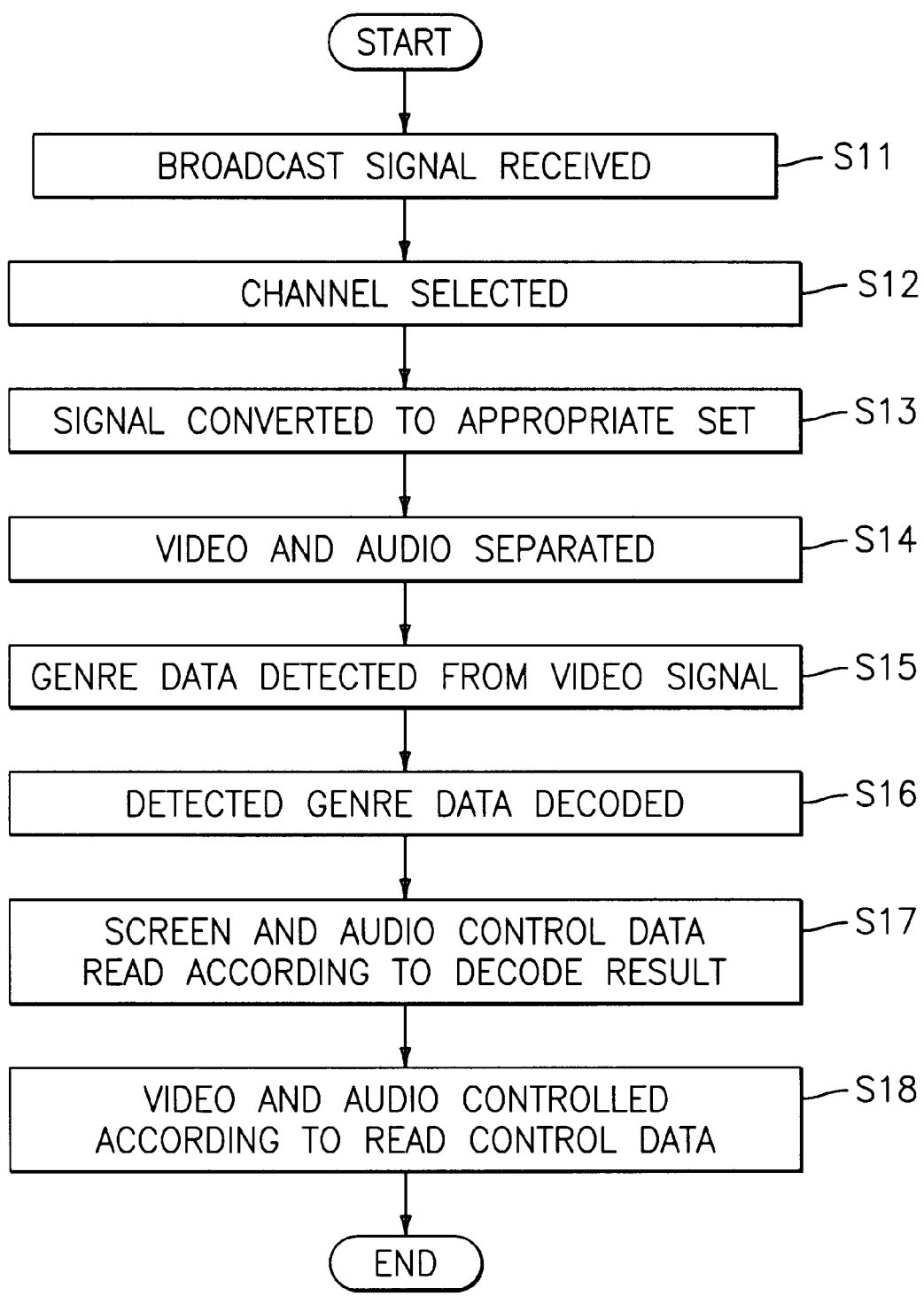
FIG. 4 is a flow chart for a method automatically converting video and audio levels according to the present invention.

The operation of the present invention will now be described with reference to FIG. 4. At step S11, a broadcast signal output from the broadcasting station is receive through the antenna 20 so that a televiewer selected channel selected in step S12 may be viewed in accordance with the channel selection signal output from the tuner 4.

At step S13, the selected broadcast signal is converted into an appropriate signal to comply with the television set by the signal processing unit 6 and is thereafter separated into the video signal and the audio signal by the video and audio signal separation unit 8 at step S14.

At step S15, the genre data is detected from the separated video signal by the genre data detection unit 14 to be input to the control unit 16. At step S16, the genre data is decoded by the control unit 16, and the video and audio control signal, corresponding to the result of decoding at step S16, is read from the memory 18 at step S17.

At step S18, the control signal based on the read data is input to the audio signal processing unit 10 and the video signal processing unit 12, respectively to adjust the level of the video and audio condition.

In one example, it is assumed that the televiewer wants to watch a sports program. The broadcasting station sends a broad cast signal for the video and audio for sports so that KBPS code or other broadcasting system code, as a reservation recording code, is inserted into the vertical blanking period with the genre data.

The broadcast signal is received through the antenna 2 selectively by the tuner 4, thereby only receiving the signal belonging to the sports channel which the televiewer selected. Thereafter, the signal is processed to become the appropriate signal to comply with the television set.

The appropriate signal is separated into a video signal and an audio signal in step S14. At this time, the code detection unit 14 detects the genre data and, and for example, KBPS code in the vertical blanking period for the separated video signal which is transmitted to the control unit 16 in S15.

The control unit 16 controls the genre data to be decoded to sports genre in S16 to read the video and audio control signal belonging to the sports genre from the memory 18 in S17.

As shown in FIG. 3, in the case of sports genre the control unit 16 controls the screen to be more light and controls audio to become medium and high sound of 70% and low sound of 30%. In S18, the control unit 16 controls the audio signal processing unit 10 and the video signal processing unit 12 according to the video and audio control signal corresponding to the read sports genre so that the televiewer enjoys the best quality of video and audio condition through the speaker 22 and the CRT 24.

As the foregoing description, according to the present invention, a broadcast signal including genre data is processed for being converted into an appropriate signal according to a control signal previously stored in a memory to provide a best condition for the video and audio levels. Furthermore, the televiewer can change data for the video and audio levels established to fit the genre data at the time of manufacturing the set, and can adjust the current program being broadcasted to a certain data set for video and audio levels responsive to genre data.

While the present invention has been described and illustrated herein with reference to preferred embodiments thereof, it will be understood by those skilled in the art that various changes in form and details may be made therein without departing from the spirit and scope of the invention.

What is claimed is:

1. A method for automatically adjusting video and audio levels, comprising the steps of:

receiving a broadcast signal through an antenna from a broadcasting station;

detecting genre data of a program from the broadcast signal;

decoding the detected genre data of the program;

reading a video and audio control signal corresponding to the result of decoding; and adjusting the video and audio levels according to the control signal.

2. The method as recited in claim 1, wherein the step of detecting genre data includes the step of retrieving genre data during a vertical blanking period.

3. The method as recited in claim 1, further comprises the step of sending genre data based on a program type.

4. The method as recited in claim 1, further comprises the step of processing the broadcast signal in compliance with a television set.

5. The method as recited in claim 1, further comprises the step of separating the broadcast signal into video and audio signals.

6. The method as recited in claim 1, further comprises the step of presetting video and audio levels responsive to genre data for the video and audio levels.

7. A broadcast signal receiving device having automatically adjusted video and audio signal levels, comprising;

receiving means for receiving a broadcast signal from a broadcasting station;

means for detecting and decoding genre data of a program from the broadcast signal;

means for generating a video and audio control signal corresponding to the result of the decoded genre data; and adjusting means for adjusting the video and audio levels according to the control signal.

8. The device as recited in claim 7, wherein the receiving means includes an antenna and a tuner.

9. The device as recited in claim 7, wherein the means for generating includes a control unit.

10. The device as recited in claim 7, further comprises a cathode ray tube for displaying video in accordance with the video level.

11. The device as recited in claim 7, further comprises at least one speaker for outputting audio in accordance with the audio level.

12. The device as recited in claim 7, further comprises a signal processor for processing the broadcast signal to be converted into an appropriate to comply with a set.

13. A broadcast signal receiving device having automatically adjusted video and audio signal levels, comprising:

a tuner for receiving a broadcast signal;

a signal processing unit for processing the broadcast signal inputted from the tuner to be converted into an appropriate signal to comply with a set;

a video and audio signal separation unit for separating the converted signal by the signal processing unit into a video signal and an audio signal;

an audio signal processing unit for adjusting the level of audio signal separated by the video and audio signal separation unit;

a video signal processing unit for adjusting the level of video signal separated by the video and audio signal separation unit;

a genre data detection unit for detecting genre data of a program from the video signal separated by the video and audio signal processing unit;

a control unit for reading video and audio control data by decoding the detected data by the data detection unit and outputting control signal to control the overall operation of the device; and a memory for storing a control signal for the read video and audio signal.

14. The device as recited in claim 13, wherein the set is a television set.

15. The device as recited in claim 13, further comprises a key input unit for inputting channel selections to the control unit.

16. The device as recited in claim 13, further comprises a cathode ray tube for displaying video in accordance with the video level.

17. The device as recited in claim 13, further comprises at least one speaker for outputting audio in accordance with the audio level.

* * * * *